United States Patent [19]

Tomiyasu et al.

[11] 4,440,029

[45] Apr. 3, 1984

[54] IMPACT FLOW METER

[75] Inventors: Hiroshi Tomiyasu, Yokohamashi; Hiroaki Tanaka, Kawasakishi, both of Japan

[73] Assignee: Sankyo Dengyo Co., Ltd., Japan

[21] Appl. No.: 377,966

[22] Filed: May 13, 1982

[30] Foreign Application Priority Data

May 16, 1981 [JP] Japan ................ 56-073833

[51] Int. Cl.³ .............................................. G01F 1/30
[52] U.S. Cl. .................................................. 73/861.73
[58] Field of Search ....................... 73/861.73, 861.74; 222/55

[56] References Cited

U.S. PATENT DOCUMENTS 4,069,709 1/1978 Volk et al. ..................... 73/861.73

FOREIGN PATENT DOCUMENTS 2947414 5/1981 Fed. Rep. of Germany ... 73/861.73

Primary Examiner—Charles A. Ruehl
Attorney, Agent, or Firm—Steinberg & Raskin

[57] ABSTRACT

An impact flow meter for measuring a horizontal impact force produced by falling material has a frame and a sensing plate having a front surface and a spaced opposite back surface. A hanging device hangs the plate vertically on the frame thereby preventing material from adhering to the plate. A flow guide is mounted in the frame in front of the front surface of the plate at an inclination with the vertical for directing the falling material to the front surface of the plate whereby the plate is struck by the material. An impact force detector couples the back surface of the plate to the frame for measuring the horizontal impact force of the material.

10 Claims, 3 Drawing Figures

IMPACT FLOW METER

BACKGROUND OF THE INVENTION

The present invention relates to an impact flow meter. More particularly, the invention relates to an impact flow meter for measuring a horizontal impact force produced by falling material. The material may constitute powder and/or bulk solids.

In known types of impact flow meters, the weight of the sensing plate is many times, as much as one hundred times, the impact force. The great weight of the sensing plate is required for its necessary great structural strength and results in friction during movement thereof under the impact of falling material. This is a disadvantage, since the sensing plate should move as closely to frictionless as possible. Furthermore, powder falling onto the sensing plate may adhere to it, since said plate is not vertically mounted. Also, if the flow meter is not mounted at a correct and proper level, its zero point shifts during operation and results in an erroneous measurement of the impact force.

SUMMARY OF THE INVENTION

The principal object of the invention is to provide an impact flow meter of simple structure for measuring a horizontal impact force produced by falling material.

An object of the invention is to provide an impact flow meter for measuring a horizontal impact force produced by falling material, which meter has a sensing plate mounted in a manner which prevents material from adhering thereto.

Another object of the invention is to provide an impact flow meter for measuring a horizontal impact force produced by falling material, which flow meter has a sensing plate which is hung substantially vertically and in a manner whereby any movement of said plate is substantially frictionless.

Still another object of the invention is to provide an impact flow meter for measuring a horizontal impact force produced by falling material, which flow meter includes a sensing plate of great structural strength mounted in a manner whereby its movement under the impact of falling material is substantially frictionless.

Yet another object of the invention is to provide an impact flow meter for measuring a horizontal impact force produced by falling material, which flow meter functions efficiently, effectively and reliably to accurately measure a horizontal impact force.

Another object of the invention is to provide an impact flow meter for measuring a horizontal impact force produced by falling material, which flow meter includes an amplifier for amplifying the force of impact of falling material on the sensing plate efficiently, effectively and reliably.

Still another object of the invention is to provide an impact flow meter for measuring a horizontal impact force produced by falling material, which flow meter counteracts a zero shift caused by operation while mounted at an incorrect level, thereby eliminating impact force measurement error which results from operation while mounted at an incorrect level.

Yet another object of the invention is to provide an impact flow meter for measuring a horizontal impact force produced by falling material, which flow meter requires considerably less maintenance than known similar flow meters.

In accordance with the invention, the impact flow meter for measuring a horizontal impact force produced by falling material comprises a frame and a sensing plate having a front surface and a spaced opposite back surface. A hanging device hangs the plate substantially vertically on the frame thereby preventing material from adhering to the plate. A flow guide is mounted in the frame in front of the front surface of the plate at an inclination with the vertical for directing the falling material to the front surface of the plate whereby the plate is struck by the material. An impact force detector couples the back surface of the plate to the frame for measuring the horizontal impact force of the material.

The hanging device comprises strip springs.

The impact force detector comprises load cells.

The sensing plate has a top edge and a spaced opposite bottom edge. A counterweight is mounted on the plate at the top edge thereof for counteracting any torque produced by the plate.

An amplifier amplifies the force of impact of the material on the sensing plate. The amplifier comprises a beam affixed to, and extending outwardly from, the back surface of the plate. The beam has a free end spaced from the plate. A lever has a top edge and a spaced opposite bottom edge. A first connector connects the lever to the free end of the beam in the area of the top edge of the lever. A second connector connects the lever to the frame in the area of the bottom edge of the lever. The impact force detector is affixed to the frame and coupled to the lever intermediate the top and bottom edges of the lever.

The front and back surfaces of the sensing plate are substantially parallel.

The top and bottom edges of the sensing plate are substantially parallel.

The lever is in spaced substantially parallel relation with the sensing plate.

Each of the first and second connectors comprises a wire. Each wire constitutes a piano wire.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
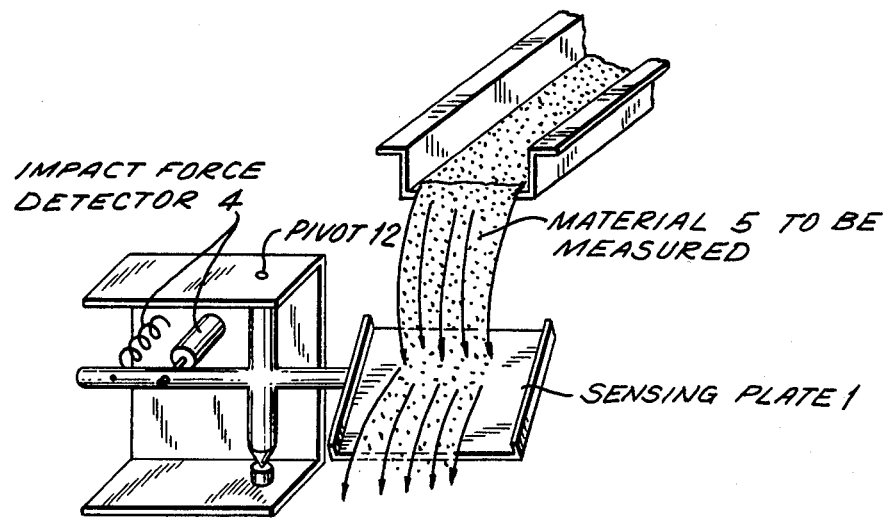
FIG. 1 is a schematic diagram of an embodiment of an impact flow meter of the prior art for measuring a horizontal impact force produced by falling material.

FIG. 1 shows an embodiment of an impact flow meter of the prior art for measuring a horizontal impact force produced by falling material. In the known embodiment of FIG. 1, a sensing plate 1 and an impact force detector 4 are supported by the same pivot 12. The impact force detector 4 is of any suitable known type and functions in a known manner. The pivot 12 must be of great structural strength and must rotate as close to frictionless as possible, in order to support the heavy sensing plate 1 and to permit accurate function of the flow meter. The weight of the sensing plate 1 is usually about one hundred times greater than the impact force of the material 5 falling on said plate.

Since the sensing plate 1 is mounted at an angle with the vertical, the material 5 tends to adhere to said sensing plate, when it is powder, and especially when it is sticky powder. The adherence of powder to the sensing plate 1 is a problem since it distorts the measurement of the impact force.

Figure 2:
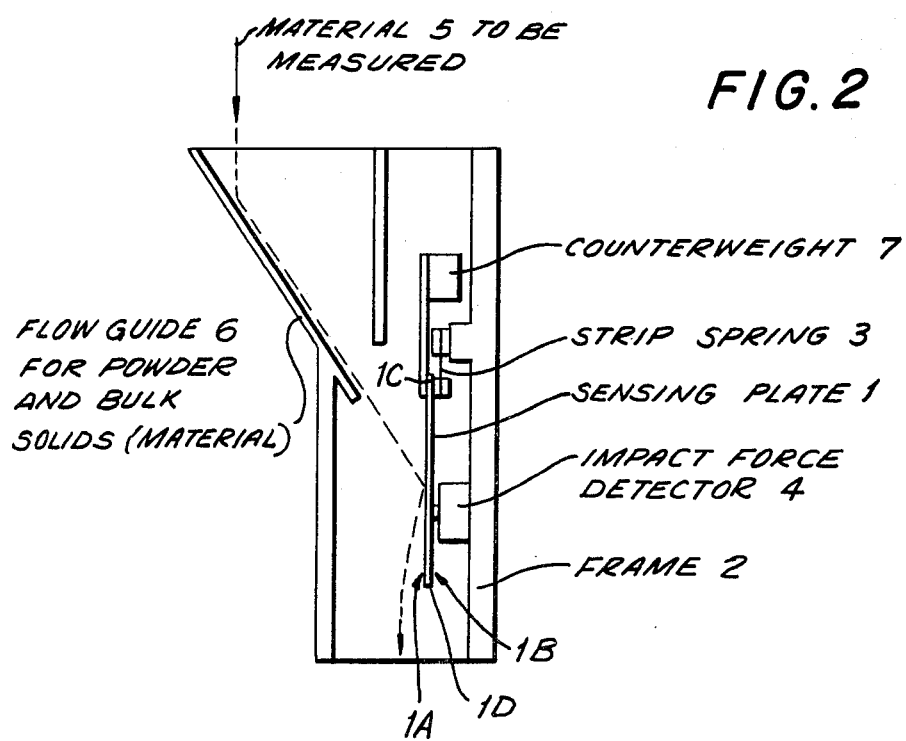
FIG. 2 is a schematic diagram, viewed from a side, of an embodiment of the impact flow meter of the invention for measuring a horizontal impact force produced by falling material.
Figure 3:
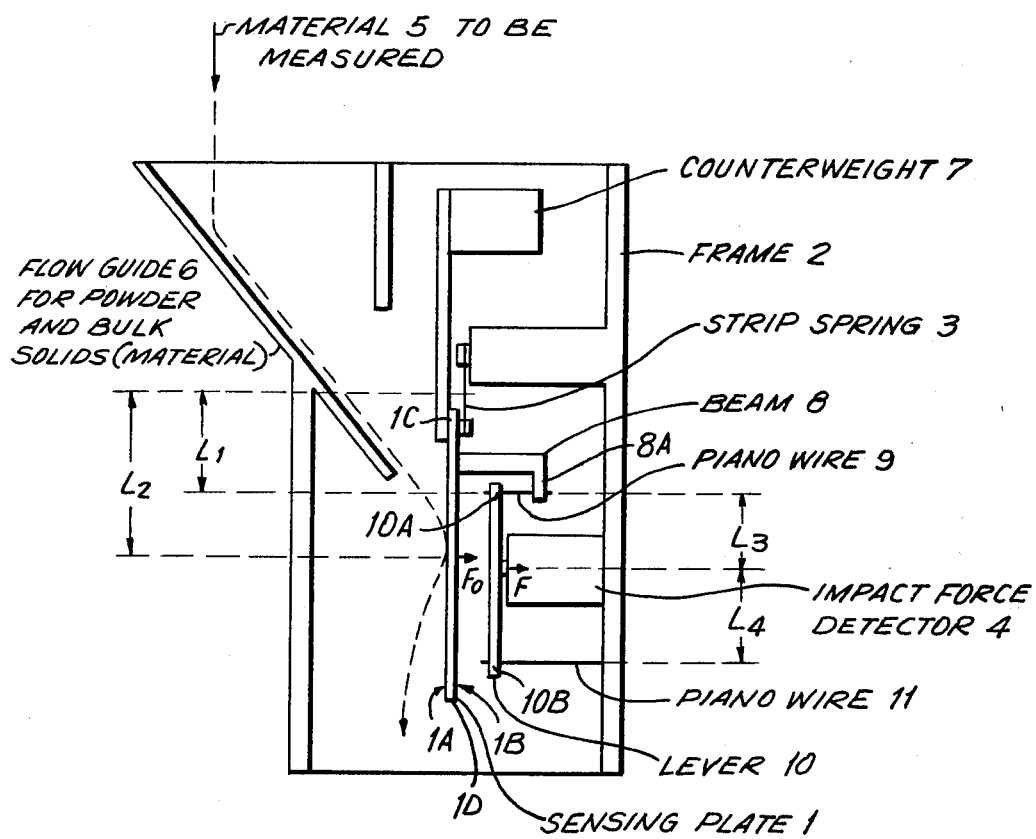
FIG. 3 is a schematic diagram, on an enlarged scale, viewed from a side, of another embodiment of the impact flow meter of FIG. 2.

The impact flow meter of the invention overcomes the shortcomings of the flow meters of the prior art. As shown in FIGS. 2 and 3, the naturally falling material 5 to be measured strikes a flow guide 6 which is mounted in a frame 2 at an inclination with the vertical and directs the falling material to the front surface 1A of the sensing plate 1. The sensing plate 1 has the front surface 1A and a spaced opposite back surface 1B, which are in substantially parallel relation. The sensing plate 1 also has a top edge 1C and a spaced opposite bottom edge 1D in substantially parallel relation (FIGS. 2 and 3). The sensing plate 1 is hung substantially vertically on the frame 2 and is positioned in front of the flow guide 6, whereby the front surface 1A of said plate is struck by the material 5, as shown in FIGS. 2 and 3.

Since the sensing plate 1 is hung substantially vertically via strip springs 3, the material 5 is prevented from adhering to said plate. An impact force detector 4, such as, for example, load cells, couples the back surface 1B of the sensing plate 1 to the frame 2 and measures the horizontal impact force of the material 5 in the usual manner, producing an electrical signal corresponding to such impact force and thereby to the flow of said material.

The impact flow meter of the invention, as shown in FIGS. 2 and 3, thus replaces the pivot 12 of the prior art flow meter with the strip springs 3, thereby considerably reducing the friction of movement of the sensing plate 1 and eliminating the adherence of material to said plate. Even if the sensing plate 1 is large and heavy, its movement under impact is essentially frictionless in the embodiments of FIGS. 2 and 3.

If the level of the flow meter shifts during operation of said flow meter, the zero point of said flow meter shifts and results in error in the measurement result of the horizontal impact force. The zero shift is eliminated by a counterweight 7 mounted on the sensing plate 1 at the top edge 1C thereof, as shown in FIGS. 2 and 3. The counterweight 7 functions to counteract any torque or momentum produced by the sensing plate 1 about the strip springs 3. Since the level of installation of the flow meter is almost always incorrect, the counterweight 7 is of great importance in overcoming the adverse effects thereof.

The impact force of the material 5 on the sensing plate 1 is quite small, compared with the flow rate of said material and is sometimes too small for accurate detection by the impact force detector 4. Thus, for example, the material 5 flowing at one ton per hour produces only about thirty to fifty grams of horizontal impact force on the sensing plate 1. It is thus expedient to amplify the force of impact of the material 5 on the sensing plate 1.

The embodiment of FIG. 3 of the flow meter of the invention includes an amplifier for amplifying the force of impact of the material 5 on the sensing plate 1. The amplifier comprises a beam 8 affixed to and extending outwardly from, the back surface 1B of the plate 1. The beam 8 has a free end 8A spaced from the plate 1. A first connector 9, which is preferably a piano wire, connects a lever 10 to the free end 8A of the beam 8 in the area of the top edge 10A of said lever. A second connector 11, which is preferably a piano wire, connects the lever 10 to the frame 2 in the area of a bottom edge 10B of said lever.

The lever 10 is in spaced substantially parallel relation with the sensing plate 1. The impact force detector 4 is affixed to the frame and coupled to the lever 10 intermediate the top and bottom edges 10A and 10B of said lever.

The horizontal impact force $F_o$ produced on the sensing plate 1 is amplified to a force F by the amplifier. The force F is measured by the impact force detector 4 and equals $$F = (L_2/L_1) \times [(L_3 + L_4)/L_4] \times F_o$$

wherein, as shown in FIG. 3, $L_1$ is the distance between the strip springs 3 and the point at which the horizontal impact force $F_0$ acts on the lever 10, $L_2$ is the distance between the strip springs 3 and the point at which the horizontal impact force $F_o$ acts on the sensing plate 1, $L_3$ is the distance between the point at which the horizontal impact force $F_o$ acts on the lever 10 and the impact force detector 4, and $L_4$ is the distance between the impact force detector 4 and the point at which the lever 10 is affixed to the frame 2.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An impact flow meter for measuring a horizontal impact force produced by falling material, said flow meter comprising:
    a frame;
    a sensing plate having a front surface and a spaced opposite back surface;
    hanging means hanging said plate substantially vertically on said frame thereby preventing material from adhering to said plate;
    a flow guide mounted in the frame in front of the front surface of said plate at an inclination with the vertical for directing the falling material to said front surface of said plate whereby said plate is struck by said material; and
    an impact force detector coupling the back surface of said plate to said frame for measuring the horizontal impact force of said material.

2. An impact flow meter as claimed in claim 1, wherein said hanging means comprises strip springs.

3. An impact flow meter as claimed in claim 1, wherein said impact force detector comprises load cells.

4. An impact flow meter as claimed in claim 1, wherein said sensing plate has a top edge and a spaced opposite bottom edge, and further comprising a counterweight mounted on said plate at said top edge thereof for counteracting any torque produced by said plate.

5. An impact flow meter as claimed in claim 4, wherein said top and bottom edges of said sensing plate are substantially parallel.

6. An impact flow meter as claimed in claim 1, further comprising an amplifier for amplifying the force of impact of said material on said sensing plate, said amplifier comprising a beam affixed to, and extending outwardly from, said back surface of said plate, said beam having a free end spaced from said plate, a lever having a top edge and a spaced opposite bottom edge, first connecting means connecting said lever to the free end of said beam in the area of the top edge of said lever, and second connecting means connecting said lever to said frame in the area of the bottom edge of said lever, said impact force detector being affixed to said frame and coupled to said lever intermediate said top and bottom edges of said lever.

7. An impact flow meter as claimed in claim 6, wherein said lever is in spaced substantially parallel relation with said sensing plate.

8. An impact flow meter as claimed in claim 6, wherein each of said first and second connecting means comprises a wire.

9. An impact flow meter as claimed in claim 8, wherein each said wire constitutes a piano wire.

10. An impact flow meter as claimed in claim 1, wherein said front and back surfaces of said sensing plate are substantially parallel.

* * * * *